June 27, 1933.   J. BIBBY   1,915,399

FLEXIBLE COUPLING

Filed Sept. 27, 1929

Inventor

James Bibby

By Ralph W. Brown.

Attorney

Patented June 27, 1933

1,915,399

UNITED STATES PATENT OFFICE

JAMES BIBBY, OF LONDON, ENGLAND, ASSIGNOR TO THE FALK CORPORATION, OF MILWAUKEE, WISCONSIN, A CORPORATION OF WISCONSIN

FLEXIBLE COUPLING

Application filed September 27, 1929, Serial No. 395,588, and in Great Britain October 10, 1928.

This invention relates to power transmission couplings and has for its object to provide an improved coupling particularly for enabling power to be transmitted without undue strain or shock between shafts that are not in true axial alignment.

In many power transmissions in which the axes of two shafts are out of alignment their interconnection is effected by one or more Cardan joints including in some cases an intermediate or so-called Cardan shaft. While such Cardan or universal jointing of shafts deals satisfactorily with any out of alignment of the shafts it does not provide resiliency from the torsional point of view.

According to the present invention I provide a power transmission coupling combining the principle of the Cardan or universal joint with torsional resiliency such for example as that derived from the use of resilient bridging elements housed in normally aligned longitudinally extending recesses in the members to be coupled, such bridging elements preferably taking the form of the limbs of a spring steel grid. A torsional resilient coupling of the steel grid kind above referred to is fully described in the specification of my United States patent, Reissue No. 15,903 and is well suited to the present invention.

For convenience of further description I will describe one particular embodiment of the invention as applied to two shafts that are out of alignment and are inter-connected by an intermediate or Cardan shaft by two torsionally-resilient universal couplings one at each end of the Cardan shaft, but it will be understood that the invention is applicable to cases in which only one coupling is required and also to cases in which there is no room for an actual intermediate shaft, the two Cardan portions of the two couplings being directly connected to one another or being formed as one piece.

The embodiment referred to is illustrated in the accompanying drawing in which:—

Figure 1:
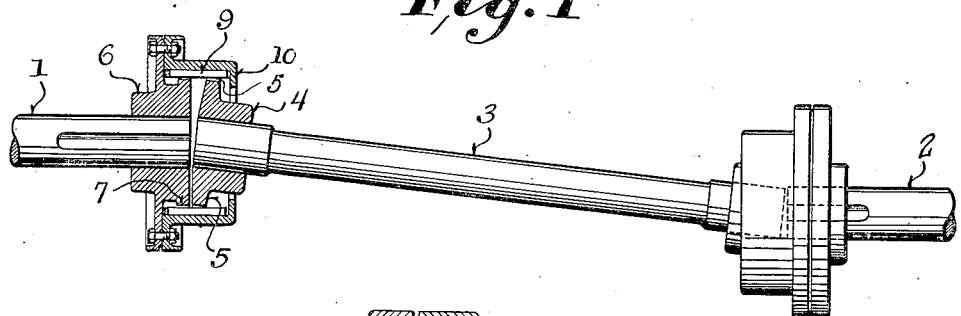
Figure 1 is a longitudinal sectional elevation of two shafts out of alignment and an inter-connecting shaft all jointed together for rotary power transmission with torsional resiliency in accordance with the present invention.
Figure 2:
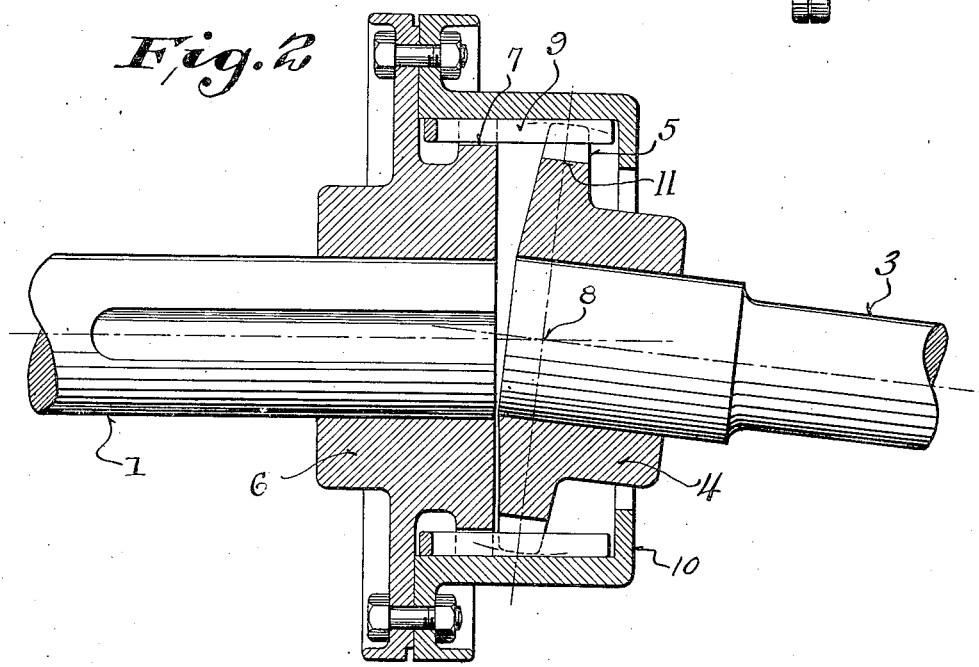
Figure 2 is an enlarged fragmentary sectional elevation of one of the torsionally resilient Cardan couplings.

The two main shafts 1 and 2 are interconnected by an intermediate or Cardanshaft 3. Each end of the Cardan shaft is provided with a disk 4 having longitudinal grooves 5 on its periphery and the adjacent end of the main shafting has a similar disc 6 having grooves 7, the metal between these grooves 5 and 7 having the general appearance of gear teeth.

The outer surface of the tooth-like formations on the end-disc 4 of the Cardan shaft 3 are spherical with respect to a centre 8 co-incident with the intersection of the axes of the main shaft and the Cardan shaft so that the Cardan shaft axis can rock about this centre 8 relative to the main shaft while always preserving a proper intersection of the two axes.

A cylindrical spring steel grid 9 is arranged with its limbs lying in the grooves 5 and 7 and bridging the two discs 4 and 6 and is enclosed by a shell or cover 10 carried preferably by the disc 6 on the main shaft.

Figure 3:
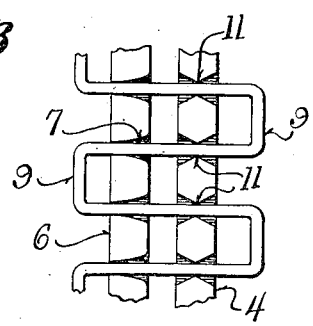
Figure 3 is a fragmentary plan view of the same with the shell or cover removed.

The side walls of the grooves 7 in the main shaft disc are preferably flared in one direction as indicated in Fig. 3, and the grooves 5 in the Cardan shaft disc 4 are each preferably flared or inclined outwardly in both directions from an intermediate point 11 coincident with a transverse plane normal to the Cardan axis and passing through the point of intersection 8 of the two axes. The amount of flaring or divergence of the side walls of the grooves 5 in the Cardan shaft disc must be sufficient to prevent any limb of the spring grid 9 from binding by bearing against the walls on opposite sides of the knife edges at the plane of minimum spacing. The minimum angle necessary for the flare or divergence is the angle of inclination of the Cardan shaft with the main shaft plus the angle of deflection of the spring limbs under maximum torsional load.

Although I regard it as preferable to mount the shell or cover 10 for the cylindrical spring grid onto the main shaft disc as already described, the arrangement may if desired for any reason be reversed, the shell or cover being mounted on the Cardan shaft disc in which case the main shaft disc will be spherical in form as to the outer surface of the teeth-like formation and the grooves in this disc will be flared or tapered to accommodate the deflections of the spring limbs and the lack of alignment of the shaft axes.

Various changes may be made in the embodiment of the invention hereinabove specifically described without departing from or sacrificing any of the advantages of the invention as defined in the appended claims.

I claim:

1. In a flexible coupling the combination of driving and driven disks, a series of peripheral grooves in one of said disks, a corresponding series of grooves in the other of said disks, each of the grooves of said last named series being flared in opposite directions from an intermediate portion thereof, torque transmitting means comprising a series of resilient limbs engaged in both series of grooves to drive one disk from the other, and a casing carried by one of said disks and coacting with the other of said disks for retaining said disks against displacement transversely of the axes of rotation thereof.

2. In a flexible coupling the combination of driving and driven disks, a series of peripheral grooves in one of said disks, a corresponding series of grooves in the other of said disks, each of the grooves of said last named series being flared in opposite directions from an intermediate portion thereof, torque transmitting means comprising a series of resilient limbs engaged in both series of grooves to drive one disk from the other, and means coacting with said disks for retaining the same against relative displacement transversely of the axes of rotation thereof.

3. In a flexible coupling the combination of driving and driven disks, a series of peripheral grooves in one of said disks, a corresponding series of peripheral grooves in the other of said disks, each of the grooves of said last named series being flared in opposite directions from an intermediate portion thereof, and a series of limbs engaged in both series of grooves to drive one disk from the other.

In witness whereof, I hereunto subscribe my name this 11th day of September, 1929.

JAMES BIBBY.